United States Patent
Srivastava et al.

(10) Patent No.: US 11,861,377 B1
(45) Date of Patent: Jan. 2, 2024

(54) REUSEABLE GROUPINGS OF APP EXTENSIONS

(71) Applicant: SAP SE, Walldorf (DE)

(72) Inventors: Garima Srivastava, Bangalore (IN); Sushama Shadakshary, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/896,846

(22) Filed: Aug. 26, 2022

(51) Int. Cl.
*G06F 9/445* (2018.01)
*G06F 8/38* (2018.01)
*G06F 8/34* (2018.01)

(52) U.S. Cl.
CPC ............ *G06F 9/44526* (2013.01); *G06F 8/34* (2013.01); *G06F 8/38* (2013.01)

(58) Field of Classification Search
CPC ..... G06F 8/34; G06F 8/38; G06F 8/71; G06F 9/44526; G06F 9/451; G06Q 10/10; G06Q 40/00
See application file for complete search history.

(56) References Cited

U.S. PATENT DOCUMENTS

| | | | | |
|---|---|---|---|---|
| 2012/0023445 | A1* | 1/2012 | Baeuerle | G06Q 40/00 715/810 |
| 2012/0030580 | A1* | 2/2012 | Schlarb | G06F 9/451 715/741 |
| 2013/0318029 | A1* | 11/2013 | Sridharan | G06Q 10/10 706/59 |
| 2014/0137079 | A1* | 5/2014 | Witteborg | G06F 8/71 717/120 |
| 2015/0067637 | A1* | 3/2015 | Charfi | G06F 21/54 717/104 |

* cited by examiner

*Primary Examiner* — Le H Luu
(74) *Attorney, Agent, or Firm* — Klarquist Sparkman, LLP

(57) ABSTRACT

The present disclosure provides techniques and solutions for enhancing or customizing the functionality of software applications, such as "apps." More particularly, the present disclosure provides for grouping app extensions into groups, such as groups representing a particular semantic domain. A group of extensions can be applied to one or more apps. Applying extensions as a group can save development time and effort, as can the ability to apply a given extension group to multiple apps, either at the same time or over a particular time period. Further disclosed aspects assist users in implementing extensions with an extension group, such as assisting in determining where in a user interface particular extensions should appear. Once an extension group has been selected to be applied to an app, programmatic logic can cause the extensions to be automatically implemented in a computing artifact/object used by a particular extended app.

20 Claims, 13 Drawing Sheets

| Custom Fields 908 | Data Source Extensions 910 | Custom Logic 912 | Extension Groups 914 | | | | |
|---|---|---|---|---|---|---|---|
| | | | | Search 920 | | | + 924 |
| Extension Group 932 | Identifier 934 | Context 936 | Type 938 | Status 940 | Created By 942 | Created On 944 |
| Usage Indicator | YY123_UseInd | Object1 | Text | Unpublished | Garima | 1/14/2023 |
| Covid Indicator | YY123_CVI | Object1 | Text | Unpublished | Garima | 1/14/2023 |
| Consolidation Unit | YY123_ConsU | Object2 | Web Address | Published | Sushama | 1/14/2023 |
| Classification | YY123_CL | Object5 | Text | Published | Garima | 1/14/2023 |
| Vaccination Status | YY123_Vac_Stat | Object12 | Code List | Published | Garima | 1/14/2023 |
| DetailForFieldY | YY123_DetY | Object12 | Amount Interval | Published | Sushama | 1/14/2023 |
| HelpText | YY123_UseHelp | Object3 | Text | Published | Sushama | 1/14/2023 |
| ProcessConstraint | YY123_PConstr | Object7 | Text | Unpublished | Sushama | 1/14/2023 |

FIG. 9

REUSEABLE GROUPINGS OF APP EXTENSIONS

FIELD

The present disclosure generally relates to customization of software applications. Particular implementations provide for grouping of application extensions, where a group of application extensions can be applied to one or more applications.

BACKGROUND

For software applications, there is an ongoing issue in that users of the software application are typically limited to particular functionality that has been programmed into an application. A user may be limited in terms of both the user interfaces (UIs) available for interacting with the application and the functionality of the application. A user might find it helpful, for example, to be able to specify a new filter for data that might be processed using the application.

In some cases, the user may not have the ability to add or modify UI elements, or add or modify application functionality. In those cases, the best a user may hope for is that the desired changes get incorporated into a new release/version of the application.

In other cases, the application, or an application framework, may allow a user to add/change UI features or application functionality. However, issues can still remain. One issue is that adding/changing application features may require a level of technical skill that is not possessed by end users. Or, even if an end user has the necessary technical knowledge, they may lack appropriate permissions to modify the software application.

Even if an end user has the requisite knowledge and permissions to modify a software application, or if the modification is being carried out by a more technical user (such as a developer/programmer), modifying software functionality can be time consuming and tedious.

These problems can be exacerbated to an extent when software applications or frameworks are designed to make it easier for users to create or modify software applications, including software applications that may take advantage of a development framework or have relatively limited functionality (often referred to as "apps"). In the case of "apps" for example, an app might be developed for a particular use case scenario, such as scenario where particular data is obtained and processed in a particular way to provide a report or data visualization. Another app may have similar functionality, but be directed to at least a somewhat different use case (or may simply have a different data source, type of processing, report format, visualization type, etc.). It may be desirable to modify both apps to incorporate some new or changed feature, but typically these modifications must be implemented separately for each app, increasing developmental efforts, and potentially resulting in duplicative code. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for enhancing or customizing the functionality of software applications, such as "apps." More particularly, the present disclosure provides for grouping app extensions into groups, such as groups representing a particular semantic domain. A group of extensions can be applied to one or more apps. Applying extensions as a group can save development time and effort, as can the ability to apply a given extension group to multiple apps, either at the same time or over a particular time period. Further disclosed aspects assist users in implementing extensions with an extension group, such as assisting in determining where in a user interface particular extensions should appear. Once an extension group has been selected to be applied to an app, programmatic logic can cause the extensions to be automatically implemented in a computing artifact/object used by a particular extended app.

In one aspect, the present disclosure provides for associating at least one extension group with at least one app. A list of one or more extension groups are rendered on a user interface, where at least a first extension group of the one or more extension groups includes a plurality of extensions. A selection of the at least a first extension group is received through the user interface, where the selection indicates that at least a first app is to be extended using the at least a first extension group. An identifier of the at least a first extension group is associated with an identifier of the at least a first app. One or more computing artifacts of the at least a first app are updated to include extensions of the plurality of extensions of the at least a first extension group.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 9 is an example user interface screen for presenting domain information and facilitating the creation of new extension groups or the application of existing extension groups to apps.

DETAILED DESCRIPTION

Example 1—Overview

Figure 1:
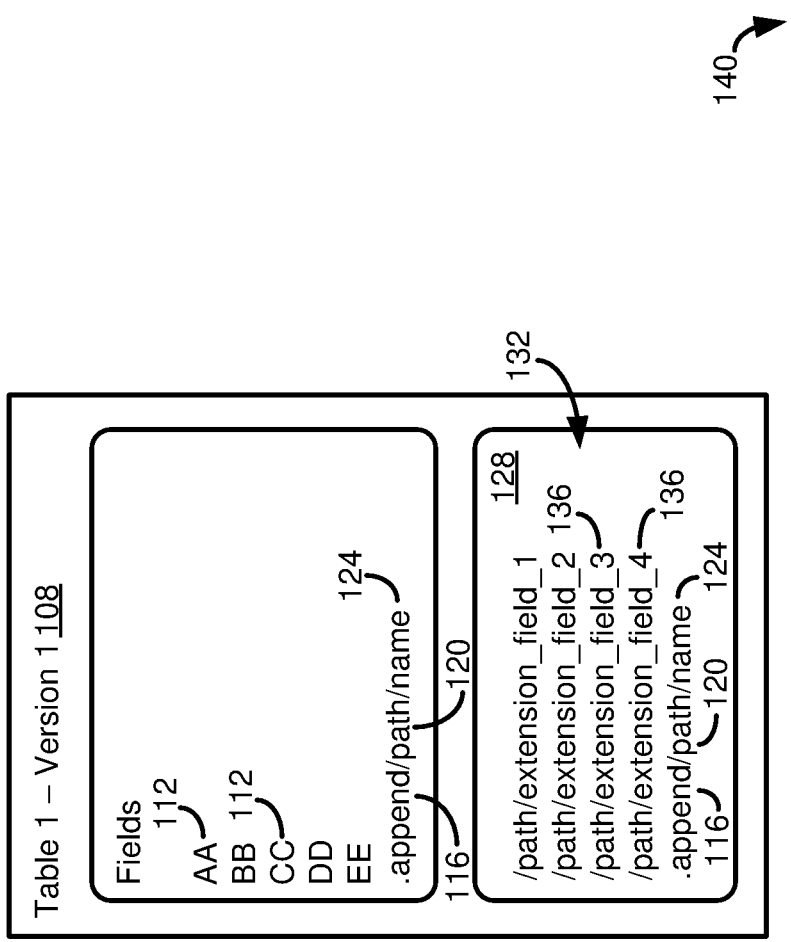
FIG. 1 is a diagram illustrating a definition of a table having primary data and extension (or append) data, and a logical view of the table.

For software applications, there is an ongoing issue in that users of the software application are typically limited to particular functionality that has been programmed into an application. A user may be limited in terms of both the user interfaces (UIs) available for interacting with the application and the functionality of the application. A user might find it helpful, for example, to be able to specify a new filter for data that might be processed using the application.

In some cases, the user may not have the ability to add or modify UI elements, or add or modify application functionality. In those cases, the best a user may hope for is that the desired changes get incorporated into a new release/version of the application.

In other cases, the application, or an application framework, may allow a user to add/change UI features or application functionality. However, issues can still remain. One issue is that adding/changing application features may require a level of technical skill that is not possessed by end users. Or, even if an end user has the necessary technical knowledge, they may lack appropriate permissions to modify the software application.

Even if an end user has the requisite knowledge and permissions to modify a software application, or if the modification is being carried out by a more technical user (such as a developer/programmer), modifying software functionality can be time consuming and tedious.

These problems can be exacerbated to an extent when software applications or frameworks are designed to make it easier for users to create or modify software applications, including software applications that may take advantage of a development framework or have relatively limited functionality (often referred to as "apps"). In the case of "apps" for example, an app might be developed for a particular use case scenario, such as scenario where particular data is obtained and processed in a particular way to provide a report or data visualization. Another app may have similar functionality, but be directed to at least a somewhat different use case (or may simply have a different data source, type of processing, report format, visualization type, etc.). It may be desirable to modify both apps to incorporate some new or changed feature, but typically these modifications or extensions must be implemented separately for each app, increasing developmental efforts, and potentially resulting in duplicative code. Accordingly, room for improvement exists.

One improvement that can be made to typical software augmentation paradigms is to allow a particular augmentation feature, such as new programmatic logic, data element (or attribute), or a new user interface element, to be easily shared between apps (or full software applications, but where "apps" will be generally discussed for the remainder of the disclosure for convenience of presentation). However, even in this case, a user may need to manually locate and "activate" an augmentation (also referred to as an "extension"). If an app includes many extensions, it can be time consuming to manually locate and activate these extensions for another app.

Accordingly, in one aspect, the present disclosure provides for the grouping of extensions into a particular group, class, or domain. The term "extension group" is generally used through the remainder of the discussion, and the term "domain" can refer to an extension group/set of extensions that relates to a particular use or semantic concept. Apps themselves can also be assigned to a group, class, or domain, and can reflect a particular subject matter area of the apps. So, in particular implementations, disclosed techniques provide that a group of extensions can be specified, and where the group extensions can then be activated, or made available for activation, for one or more apps.

Disclosed techniques can also assist in implementing extensions. For example, consider an app that presents data associated with one or more database tables. An extension can be used to add a field to the database table. Consider the COVID-19 pandemic that became widespread in 2020. Software companies may have already released software that assists businesses with human resources issues, including provided a database schema (one or more tables, and typically one or more views constructed from tables or optionally other views) to store employee information. After the pandemic began, it became important to track information such as whether a particular employee had been vaccinated or whether an employee had been infected with COVID. However, since COVID was unknown and unanticipated at the time of a latest release data of the human resources software application, the database schema was not configured to store information such as vaccination status.

Adding a field to indicate a vaccination is a type of extension, then, that a user may wish to add. Software companies might not have anticipated that an extension for COVID vaccination status would be needed, but they may have anticipated that a user may wish to add some additional attribute or attributes to a schema, and so may have included functionality in the software application for implementing extensions. At a basic level, such functionality may allow a user to manually create additional fields for a database table, or associate fields with a database table (but where for example, the data for the added fields may be stored in a different database table than a database table being "extended" with the new field, such as the field for vaccination information).

An additional field for "vaccination status" typically should be available at multiple levels of a software stack. That is, the field typically should be available in an artifact, such as a relational database table, that stores vaccination status information for particular employees. That field should also typically be "exposed" for use by an end user, such as showing a UI element where a user can enter a vaccination status for a particular employee or view vaccination status information for particular employees. There may be additional layers of a software stack where the field should be available, such as in an artifact of a virtual data model that serves as an intermediate layer between the app and the database.

In some cases, a user must manually ensure that the new "vaccination status" field appears at all of the relevant layers. However, again, this can create difficulties if non-technical users wish to modify the functionality of an app, and can be time consuming to implement even for users who have the requisite knowledge. Accordingly, disclosed techniques can automate at least some aspects of app extensions, such as creating or modifying appropriate artifacts in a physical or virtual data model, including propagating an extension to lower levels of a view stack, or propagating an extension from a virtual data model to a physical data model.

Examples 2-4 of the present disclosure provide a discussion of particular ways in which extensions can be implemented and stored. Examples 5-11 describe techniques for grouping apps and extensions, and activating groups of extensions for particular applications.

Example 2— Example Implementation of Table Extensions

As described in Example 1, data used by an app may be stored in a particular format, such as in the form of database tables. The data may be used by multiple apps, or one or more apps and other software, such as middleware or a more full-featured application. Some software implementations include standard database tables for storing application data. That is, the database tables may include standard fields that are expected to be used by many end users. The tables may be part of a schema that is defined for a particular subject matter or use case, such as a schema defined for human resources applications. However, as discussed with respect to Example 1, some end users may have different needs than other users, and the standard tables may not include all fields needed by a particular user, including because the needs of a user may change over time.

Particular software can be developed anticipating that some end users may wish to add additional fields to standard database tables. For example, the ERP Central Component (ECC) of SAP SE of Walldorf, Germany, provides functionality for associating additional fields with standard database tables. In some cases, a software application and its data schema may provide standard functionality, with a standard table schema being defined for use with such standard functionality. For instance, the standard table may include base fields that are used with the application. However, certain users of the software may have particular needs such that it is desirable to include additional fields in the table. In more particular cases, an add-on or plugin to a base software application may be available to extend the functionality of the base software application. The add-on or plugin may use the standard table, but may add additional fields to the standard table to support the extended functionality, such as the "vaccination status" field discussed in Example 1. Or, some database environments, including at least certain products of SAP SE of Walldorf, Germany, provide for tables to be extended by including in a table definition a reference to an append, which can define additional fields for the table.

With reference to FIG. 1, a table 108, representing a first version of a standard table (plus any customizations), can include a plurality of fields 112. These fields may be specified, for example, in a schema or data dictionary entry for the table 108. That is, the table 108 may have an identifier, and the identifier may be associated with a definition of the table, which definition can include the fields 112, and optionally other information. For example, the definition can include, or specify, a type, where a new table can be instantiated as an instance of the particular type.

The table 108 can include a customization, or extension, identifier 116. The customization identifier 116 can be used to determine that the table 108 has information in addition to the standard information (such as standard information, including fields, maintained in the schema for the table, where a schema and associated fields can be based on a particular type associated with the table). The customization identifier 116 can be associated with a location or path 120 where additional information associated with the (custom version) of the table 108 can be retrieved. The path can be a particular file path. The customization identifier 116 and path 120 can be associated with an identifier 124, or name, of a table or file 128 (including a file containing a table, or table elements) of the additional information 132 associated with the table 108.

The additional information 132 can be in the form of additional database fields 136. The additional information 132 can include other types of information, such as defining foreign keys for the table 108, including the fields 112 or any additional fields 136 of the additional information. The additional information 132 can also include help information, such as information to be displayed to a user when a user provides input requesting help with a particular field 112, 136.

When the table 108 is instantiated, a data dictionary entry for the table 108 can be read, including the fields 112. Based on the customization identifier 116, the additional information 132 to be appended to the information in the data dictionary entry for the table 108 can be retrieved. The fields 112 and additional information 132 can be used to instantiate the table 108, such as in a database layer and as a runtime object, which can have the structure (e.g., logical view) shown in table 140.

Example 3—Example Definition and Runtime Representations of Extended Tables

Figure 2:
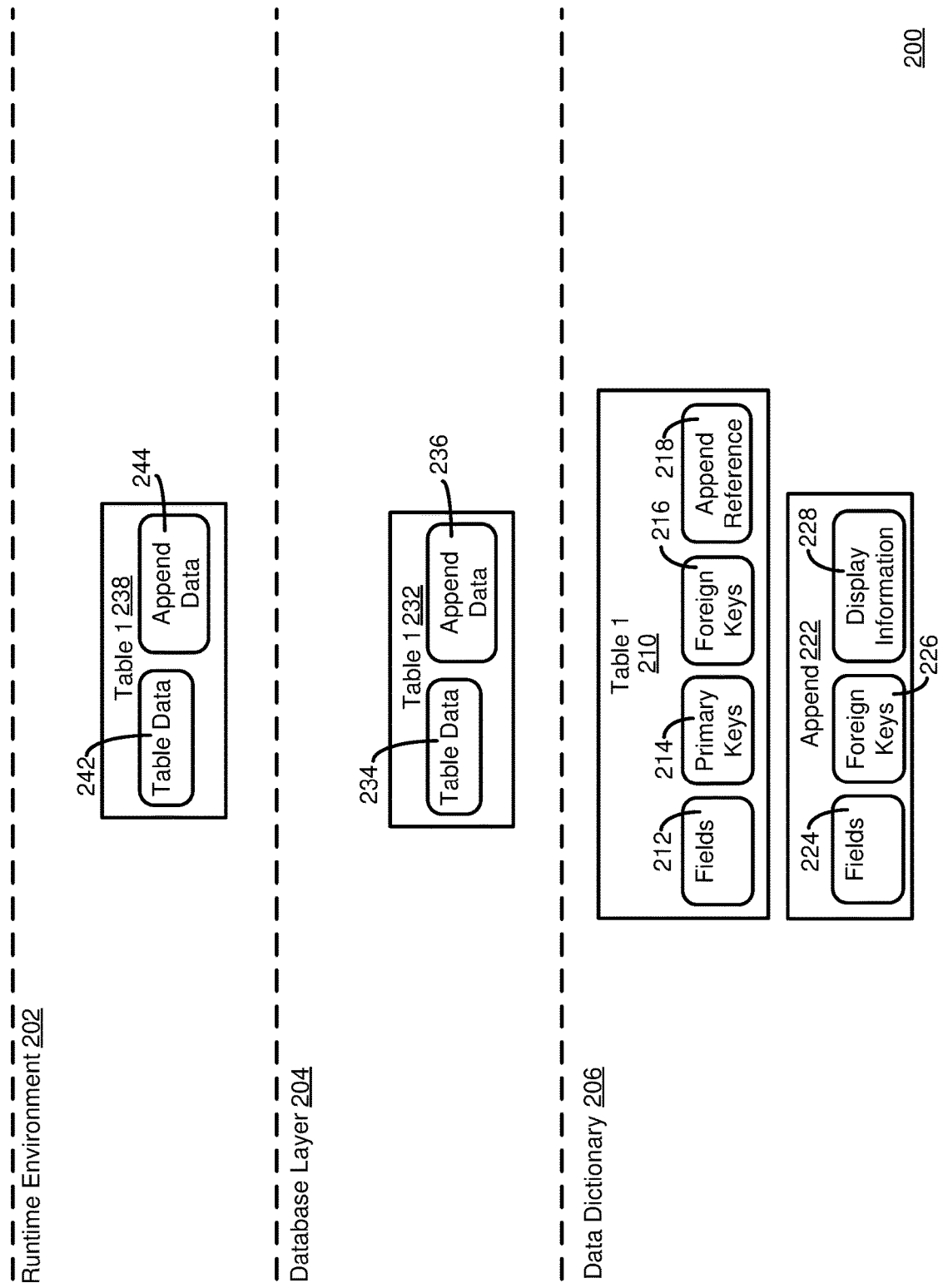
FIGS. 2 and 3 are diagrams schematically depicting how a base table and extension data can be represented in a data dictionary, a database layer, and in a runtime environment.

FIG. 2 illustrates an example database environment 200 that includes a runtime environment 202, a database layer 204, and a data dictionary or schema layer 206. A table can be represented in each of the layers 202, 204, 206. For example, a table can be defined in the data dictionary layer 206, such as by including a name or identifier for the table, field names and types for the table, primary key designations, and references for any fields that may serve as foreign keys. An object for the table in the database layer 204 can be a persisted version of the instantiated database table, including data populated into the table. An object for the table in the runtime environment 202 can be an in-memory version of the database table, or a version otherwise manipulable by a software application.

The data dictionary layer 206 includes an entry 210 for a first version of Table 1. The entry 210 includes definition of a structure of Table 1 (e.g., the identity of fields 212 in the table, primary key designations 214, foreign key references 216, and the like). The entry 210 also includes a reference 218 to an entry 222 in the data dictionary layer 206 for an append structure.

The append structure defined by the entry 222 can be a data object that is used with the entry 210 to create objects in the runtime layer 202 and the database layer 204, including objects corresponding to the table of entry 210. That is, objects in the database layer include data as defined by both the entry 210 and the entry 222. In some cases, each append is associated with a single table in the data dictionary 206. A single table, in particular aspects, can be associated with multiple append structures. In other embodiments, append structures can be associated with multiple database tables, or a table can have a single source of append or extension information. At least some of the tables in the database environment 200 need not have an associated append structure.

The entry 222 in the data dictionary layer 206 for the append can include identities of fields identifiers 224 for additional fields to be included in the database layer 204 and runtime layer 202 representations of Table 1, as well as foreign key references 226 (e.g., designating fields 224 or fields 212 as foreign keys and providing a reference to a table associated with the foreign key), and display information 228. The display information 228 can be, for example, help information to be displayed, including upon receipt of user input to display the help information. In a particular example, the display information 228 is associated with particular fields 224 or fields 212.

A database layer 204 object 232 corresponding to Table 1 includes table data 234 associated with the entry 210, and append data 236 associated with the entry 222. Similarly, a runtime layer 202 object 238 for Table 1 includes table data 242 associated with the entry 210 and append data 244 associated with the entry 222. Typically, data is the same between the object 232 and the object 238. However, the data can differ, such as if the object 238 is updated by an application and the changes have not yet been persisted in the object 232.

Example 4—Alternative Implementation of Table Extensions

Figure 3:
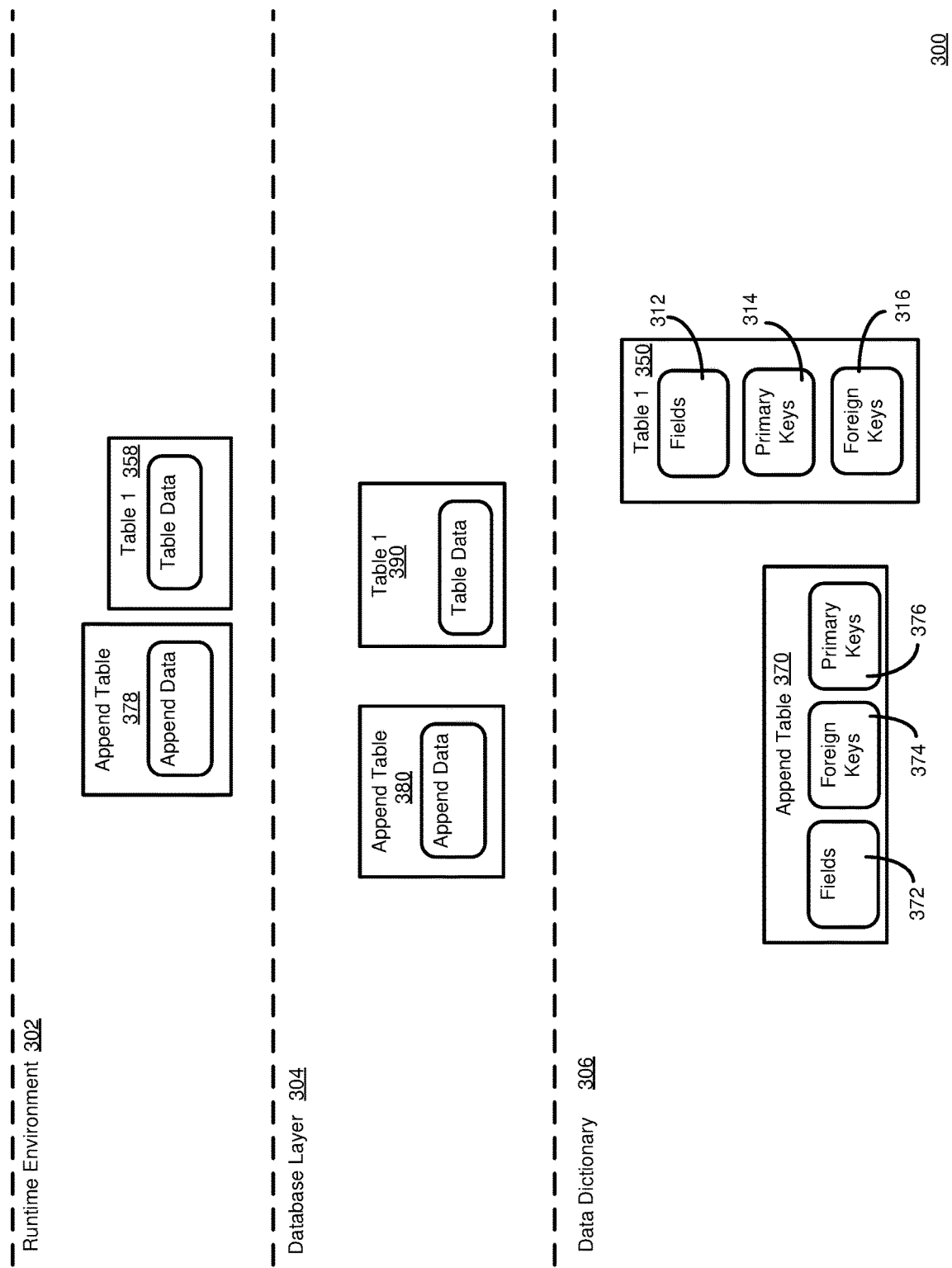

Extensions can be stored in manners other than that shown in FIG. 2. For example, FIG. 3 illustrates a database environment 300 that includes a runtime environment 302, a database layer 304, and a data dictionary layer 306 that at least generally correspond to the similarly numbered elements 202, 204, 206 of FIG. 2. Rather than having a table 210 and an append 222 as in the data dictionary 206, the data dictionary 306 includes a definition 350 of a "main" table 350 and a definition of an append table 370 that is associated with the table 350. The tables 350, 370 include respective fields 312, 372, primary keys 314, 376, and foreign keys 316, 374. The append table 370 and the main table 350 can be joined to retrieve what to external users or artefacts appears to be "unified data," such as using the primary keys 314 of the table 350 and the foreign keys 374 of the append table 370. The tables 350, 370 can be associated with corresponding tables 380, 390 at the database layer, and corresponding tables 358, 378 in the runtime environment 302.

Figure 4:
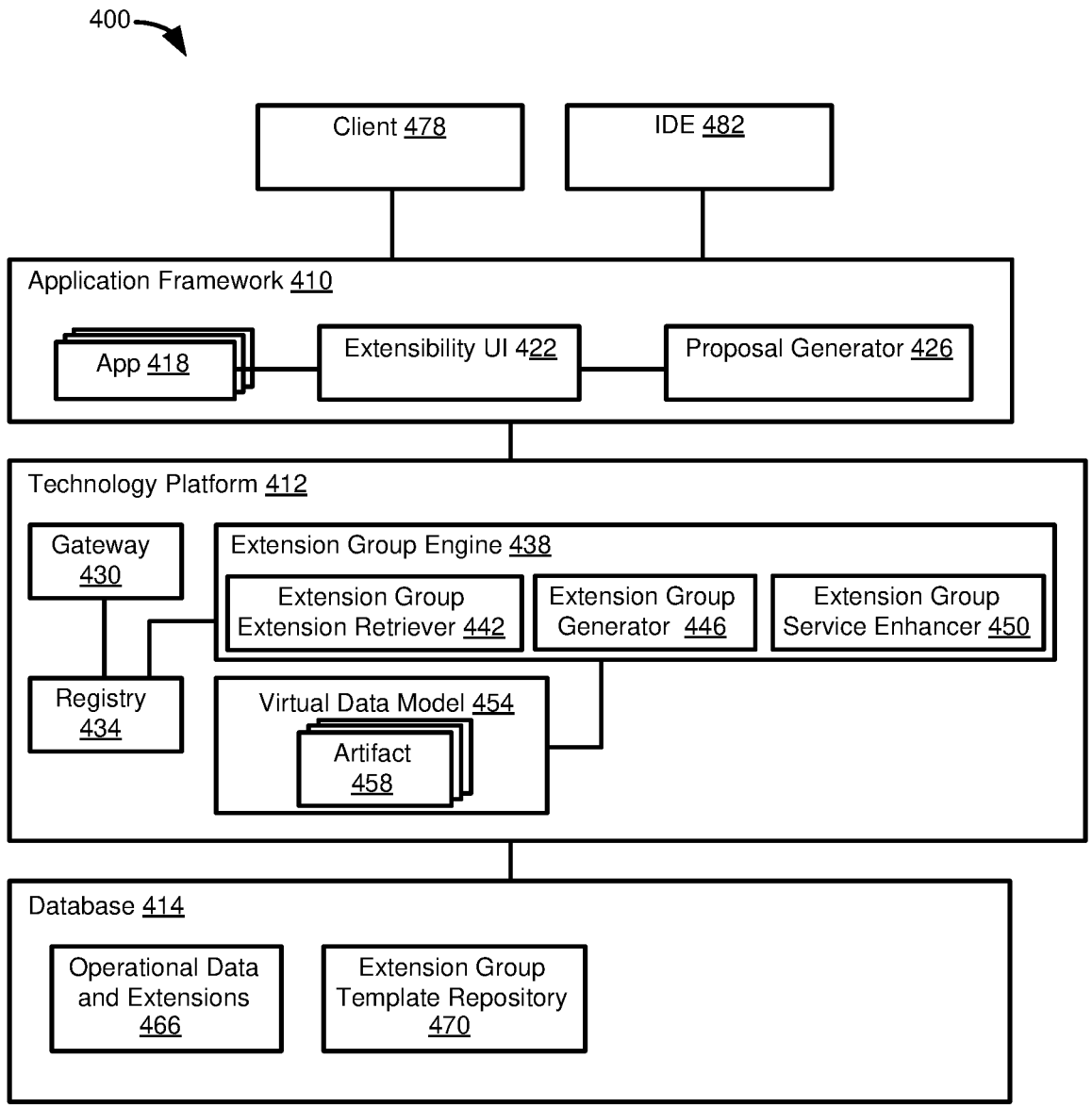
FIG. 4 is a diagram illustrating a computing environment that facilitates the generation of extension groups and the application of extension groups to apps.

Example 5—Example Computing Environment Facilitating Creation and Deployment of Extension Groups FIG. 4 illustrates a computing environment 400 in which disclosed technologies can be implemented. Generally, the computing environment 400 includes an application framework 410, a technology platform 412, and a database 414. In a specific implementation, the application framework 410 is the Fiori design system, the technology platform 412 is the ABAP Platform for S/4 HANA, and the database 414 is the HANA database software, all available from SAP SE, of Walldorf, Germany.

The application framework 410 can support the development of apps 418. Generally, the apps 418 access artifacts and functionality of the technology platform 412, and can access data stored in the database 414. The application framework 410 can include, for example, standard user interface features, such as a canvas or page, one or more layouts that can help organize UI elements on the page/canvas, and user interface elements, where the collection of user interface elements organized according to the layout on the page/canvas can be referred to as a "floorplan."

An extensibility user interface 422 of the application framework 410 can assist a user in creating and managing extension to the apps 418, either to a specific app or to a particular app component (e.g., a page, layout, floorplan). A proposal generator 426 of the application framework 410 can assist in identifying and activating extensions, more particularly groups of extensions, including assisting a user in applying extensions from an existing library to a new use. For instance, a user interface element may have been implemented in a particular layout template at a particular location for a first app, but a second app for which a user might wish to apply one or more extensions may use a different layout.

The application framework 410 communicates with the technology platform 412. In particular, the application framework 410 and the technology platform can communicate through a gateway 430. An extension group engine 438 can perform or coordinate various functionality of the present disclosure, including performing CRUD (create, read, update, delete) operations with respect to individual extensions, groups of extensions, or associations of groups of extensions with apps, where information about individual extensions, and optionally information about extension groupings or associations between apps and extension groups, can be stored in an extensibility registry 434. Extension group read requests and extension group creation requests can be carried out by an extension group extension retriever 442 and an extension group generator 446, respectively, of the extension group engine 438. An extension group enhancer service 450 of the extension group engine 438 can perform actions such as updating elements of artifacts 458 of a virtual data model 454. The modified elements can represent new data fields, and optionally information describing the calculation or use of such data fields, including how the data fields should be displayed for an app 418. Or, modified elements can be elements that modify the properties of an existing data element, or the overall function of a data element. Although the virtual data model 454 is shown as being in the technology platform 412, in other cases the virtual data model is located other than in the technology platform, but is in communication with the extension group enhancer service 450, and optionally other components of the computing environment 400 as appropriate for implementing disclosed technologies. For example, the virtual data model 454 can be in a software layer that sits between the technology platform and the database 414.

The database 414 communicates with the technology platform 412, and through the technology platform with the application framework 410. In some cases, the application framework 410, or components of the computing environment 400, such as a client 478, can communicate directly with the database 414. The database 414 stores operational data and extensions 466, where the operational data can be in the form of database artifacts such as tables or views. The database artifacts can include "base" or "standard" artifacts, or can have a set of standard attributes, where the extension are database artifacts that add additional fields to a standard artifact, or are attributes that are directly included in a standard database artifact or are otherwise associated with a standard database artifact.

The database 414 also includes an extension group template repository 470, which can include one or more database artifacts that store data associated with disclosed techniques for defining extension groups (which can include one or more extensions, and more typically include a plurality of extensions) or associations between extension groups and apps.

The client 478 can perform various actions, such as submitting CRUD requests to the technology platform 412 regarding extensions, extension groups, or assignments of extension groups to apps. The client 478 can also access the application framework 410 to use the apps 418, or to interact with the extensibility UI 422. The client 478 can query the database 414, either by directly accessing database artifacts in the database or accessing such artifacts indirectly, such as using the virtual data model 454 and its artifacts 458.

An integrated developed environment (IDE) 482 can be accessed by users (such as developers or programmers), including acting as clients 478, to perform various actions, including with respect to the application framework 410 or the technology platform 412. For example, the IDE can be used, among other things, to create or edit the apps 418, including modifying UI elements included in a floorplan or the arrangement of such elements. The IDE 482 can also be used to access the extensibility UI 422, and to interact with the proposal generator 426. The IDE 482 can optionally allow users to perform other actions, such as to perform CRUD operations with respect to data artifacts of the virtual data model 454 or the database 414.

Example 6— Example App Framework and App Structure

Figure 5:
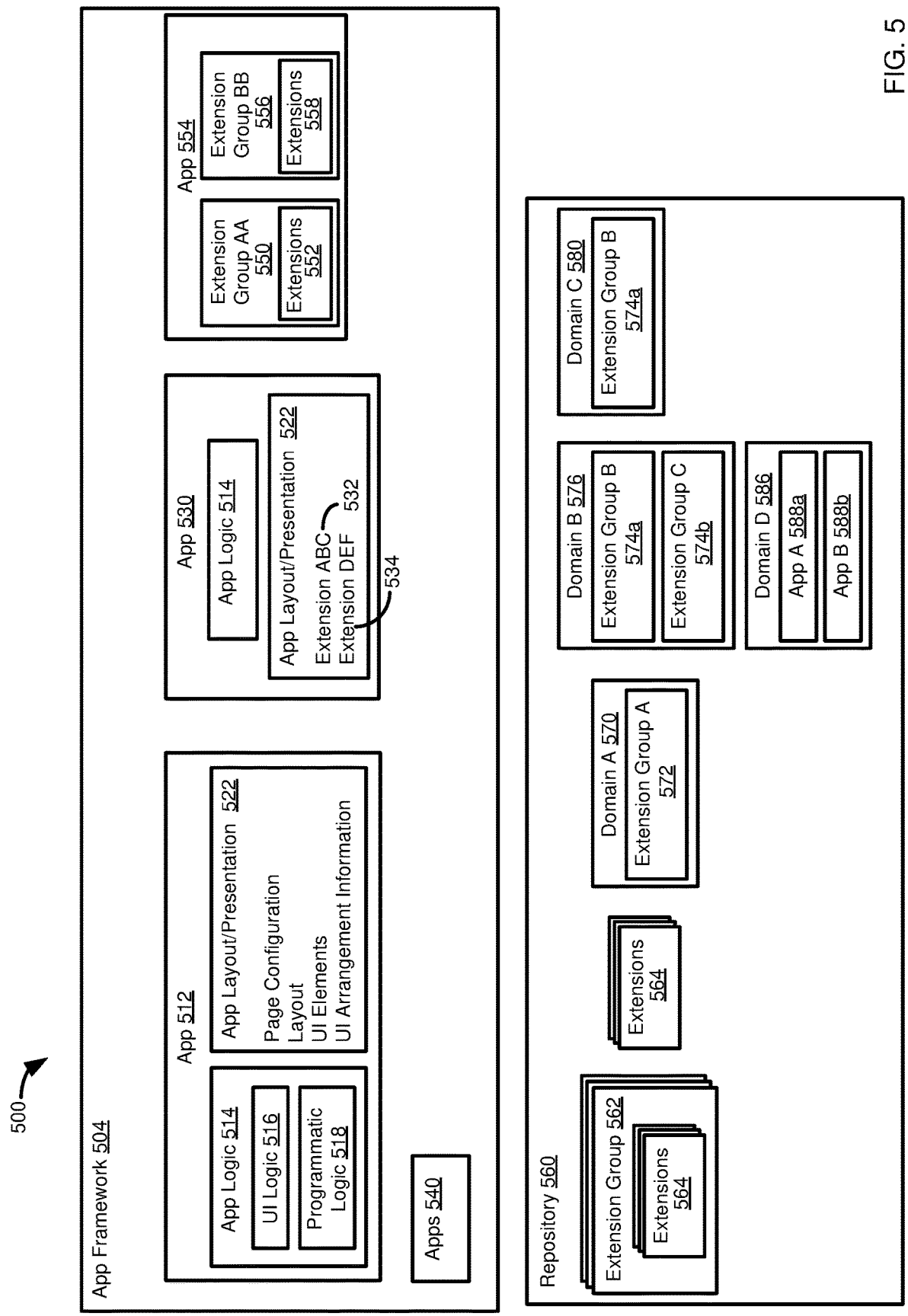
FIG. 5 is a diagram illustrating extension groups, in the form of domains, and the application of domains to apps.

FIG. 5 illustrates a computing environment 500 that depicts how extensions and apps can be grouped, and associated with one another. The computing environment 500 includes an app framework 504, which in at least some implementations can be the app framework 410 of FIG. 4.

The app framework 504 includes a variety of apps (corresponding, for example, to the apps 418). The apps can have a variety of configurations. Some apps, such as an app 512, do not have any extensions. Generally, an app includes app logic 514, which can include user interface logic 516 and programmatic logic 518. Programmatic logic 518 can include logic to accept input from a user (such as in conjunction with the user interface logic 516), including through various UI elements, process the input, and take appropriate action based on that input, such as retrieving, and optionally processing, data from a database to be displayed to a user through a UI screen of the app. User interface logic 516 can include logic to manage the display of UI elements on UI screens of the app and the receipt of user input through the user interface. As will be further discussed, in at least some cases, different UI elements or collections of UI elements can be selected to be displayed or not displayed, or displayed to particular users, such as users having specific user identifiers or users having particular credentials or roles. In particular, some apps can have UI logic 516 that allows one or more sets of extensions to be selectively enabled/displayed.

The app 512 includes layout/presentation information 522. As described in Example 5, the layout/presentation information 522 can include information that defines a presentation format for an app, such as for a particular UI screen of the app. The layout/presentation information 522 can include various templates that can be selected, created, or modified by users, which thus facilitates user design of apps. For instance, a user can start with more basic UI screen features such as a page type. The page can be a general type of "canvas" on which graphical elements and UI elements can be organized, and which can confirm to particular standards used by an engine that renders user interface screens for display. A layout can define general content areas, such as a header section, a content section, and a footer section, where graphical elements may be included to provide a consistent UI theme, and to reduce the effort in app development. Layout information can include, for example, whether a single page is presented on single UI screen or where multiple pages are presented on a single UI screen.

At a more granular level, templates, referred to as "floorplans" in the FIORI design system of SAP SE, of Walldorf, Germany, can specify graphical elements and UI elements for particular sections of a layout. Templates can be included for common types of displays provided to a user or types of tasks that might be performed by a user. In some cases, different floorplans can include at least some of the same UI elements, but the overall "look and feel" of UI screens based on the different floorplans can be quite different, and can facilitate different user tasks (including in a way where information presented is consistent with a task a user wishes to perform, which in turn may reflect the underlying programmatic logic 518 of the app). Examples of floorplans can be those configured to display a list of items, details regarding a single item, reports with graphs, or wizards that guide a user through a particular task.

An app 530 is generally similar to the app 512, including the app logic 514 and the app layout/presentation information 522. For simplified presentation, the details of the app logic 514 and the layout/presentation information 522 are not shown for the app 530 (or other apps shown in FIG. 5). However, the app 530 includes extensions 532, 534. That is, the app 530 may be identical to, or based on, the app 512, except for features of the app 530, such as app logic 514 and layout/presentation information 522, associated with the extensions 532, 534.

Now consider that a user may desire to add one or both of the extensions 532, 534 to one or more of a collection of apps 540 (and which can include an app being newly developed by the user). Typically, a user would have to manually add each extension 532, 534 (or one of any number of other extensions), to each app 540. Even if the extensions 532, 534 existed as "objects" that could be associated with one of the apps 540, it would still take time to manually identify each relevant extension and manually associate each extension with the app, including identifying how the extension should be implemented in a particular floorplan/UI design of the app.

The present disclosure allows extensions to be placed in groups, where a group of extensions can then be applied to particular apps 540. In particular, an extension group 550 can be defined that includes a plurality of extensions 552. The extension group 550 has been applied to an app 554 to provide the app with the extensions 552. In some cases, the extension group 550 itself is included in the app 554, while in other cases the grouping information is used to apply the extensions 552 to the group, but the extensions are provided in the app 554 as individual extensions, in a similar manner as to how the extension 532, 534 are included in the app 530. Note that an app can be associated with multiple extension groups, or domains, where the app 554 is shown as also being associated with an extension group 556 having extensions 558. An app can optionally include extensions that are not associated with an extension group (or, while the extensions may be part of an extension group, the extensions are directly associated with the app rather than through an extension group, such as if the extension group contains other extensions which are not desired to be associated with an app).

Extension groups 562, including the extension groups 550, 556, can be stored in a repository 560. In some cases, the repository 560 includes implementations of the actual extensions 564 in an extension group, while in other cases a definition of an extension group 562 includes identifiers of extensions in the group, but the implementation details of the extensions are included elsewhere, including within the repository 560 or in another location.

In some cases, an extension group 562 can be given a semantic identifier, which can serve as a domain (or other type of group or category) that can be assigned to apps 540. Or, a domain can be defined independently of an extension group 550, which can be useful in that it can facilitate multiple extension groups being associated with a single domain, or a single extension group being associated with multiple domains. Apps 540 can also be assigned to domains, and so a domain may be associated with one or more extension groups 562, one or more apps 540, or with both extension groups and apps.

In particular, a domain 570 is shown as being defined with respect to a single extension group 572, where the extension group has an identifier that also serves as the domain identifier. A domain 576 is shown as including extension groups 574a, 574b, where the domain is independent of the extension groups, as evidenced by the extension group 574a also being included in a domain 580.

FIG. 5 also illustrates how identifiers for apps 540 can be associated with domains (and in turn extension groups), where a domain 586 includes app identifiers 588a, 588b.

Figure 6:
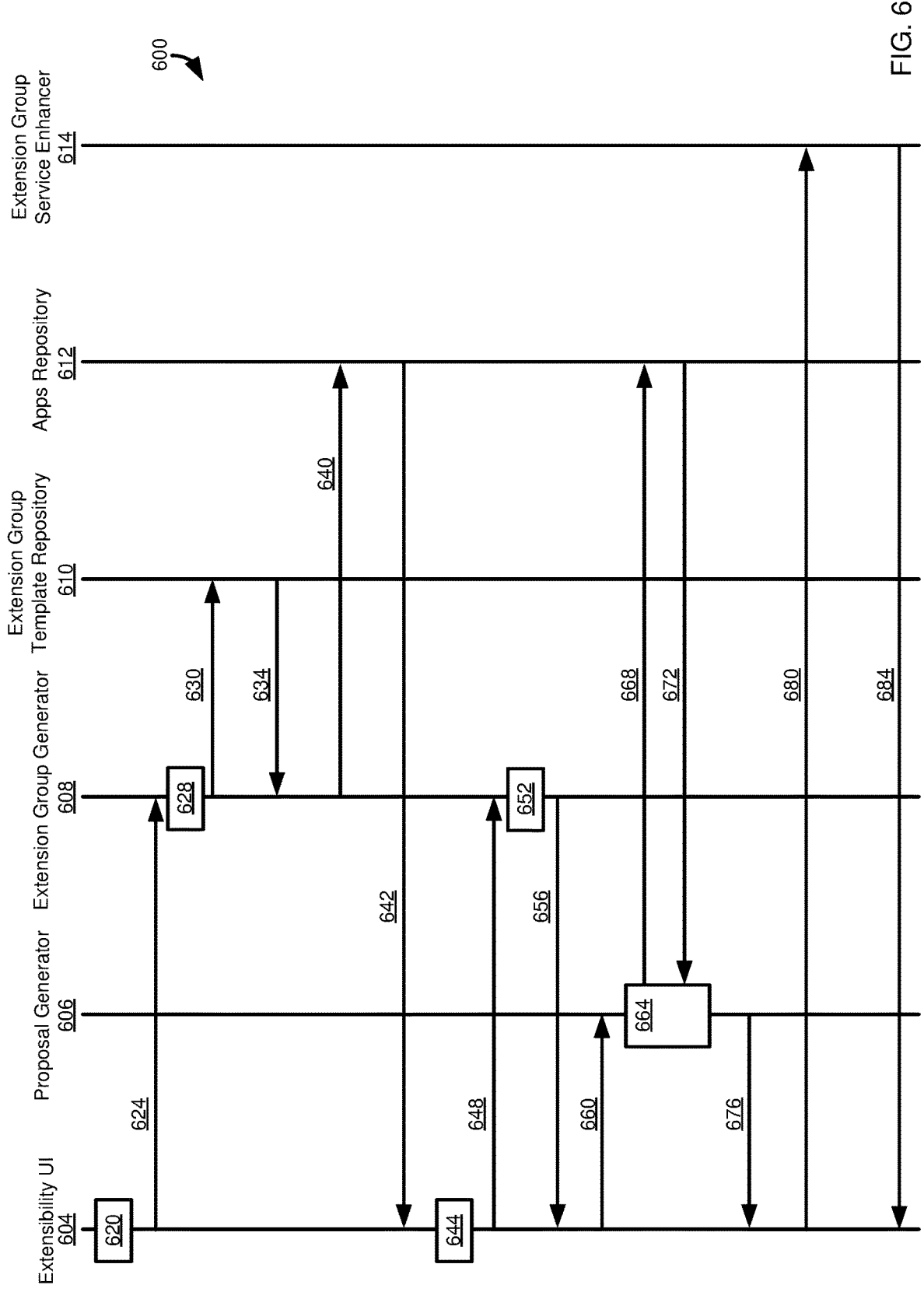
FIG. 6 is a timing diagram of a process for generating an extension group and applying the extension group to one or more apps.

Example 7— Example Process for Grouping Extensions and Deploying Extension Groups to Apps FIG. 6 is a timing diagram illustrating operations in a process 600 for creating a custom extension group, such as an extension group as described in conjunction with FIG. 4 or FIG. 5. The process 600 involves operations performed by an extensibility UI 604 (e.g., the extensibility UI 422 of FIG. 4), a proposal generator 606 (e.g., the proposal generator 426), an extension group generator 608 (e.g., the extension group generator 446), an extension group template repository 610 (e.g., the extension group template repository 470), an apps repository 612 (e.g., the apps 418 of the application framework 410), and an extension group service enhancer 614 (e.g., the extension group service enhancer 450).

At 620, an extension group creation request is provided by a user through the extensibility UI 604. The extension group creation can include a name, such as a semantic name that provides an indication to a user of the purpose or scope of the extension group and optionally a type. Types can be used, for example, to determine when extensions associated with an extension group will be visible. That is, the extension group may be associated with a particular computing process or feature, such that the extensions will be available if the particular feature or process is active. Multiple extensions, including multiple extension groups, can be associated with a given process or feature, which can facilitate making many extensions available under the same conditions. Alternatively, extension group extensions can be designated as "always active," or separate/discrete switching logic can be provided for a given extension group. In addition to providing a general type, an extension group can be associated with a particular instance of the type—such as associating an extension group with a particular process or feature in addition to designating the extension group as being associated with a type or feature, generally.

The extension group creation request is sent by the extensibility UI 604 to the extension group generator 608 at 624. At 628, the extension group generator 608 can perform various actions with respect to the request, such as determining whether the requested extension group is unique. For example, the extension group generator 608 can send a request 630 to/search the extension group template repository 610.

In some cases, "uniqueness" is determined by identifying whether another extension group has a same semantic identifier. That is, multiple extension groups can optionally have overlapping or even identical content (including extensions), provided that they are given different identifiers that will be used by users. In other cases, "uniqueness" can require some substantive difference from another extension group, such as a different switching type, mechanism, or identifier, or a difference in the extensions (including as formulated into extension groups) between extension groups. In a particular implementation, if it is determined at 628 that an extension group requested for creation is not substantively different from an existing extension group, the process 600 can throw an error, or can result in a message being presented to a user asking the user to confirm whether a substantively duplicated extension group should be created or if a user would like to take an action with respect to an existing extension group that substantively matches the requested new extension group (where such action can include, for example, associating the extension group with an app that is not already associated with the extension group).

If the extension group is determined to be unique, the extension group generator 608 can create a new identifier for the extension group, such as in the extension group template repository 610. In particular, an entry that includes an identifier for the extension group can be added to a table that stores extension group template identifiers. An entry can also be added to a table that associates extension groups with particular switching functionality. A success or failure message (such as in response to determining that an extension group was not determined to be unique) can be sent by the extension group template repository 610 to the extension group generator at 634.

Figure 7:
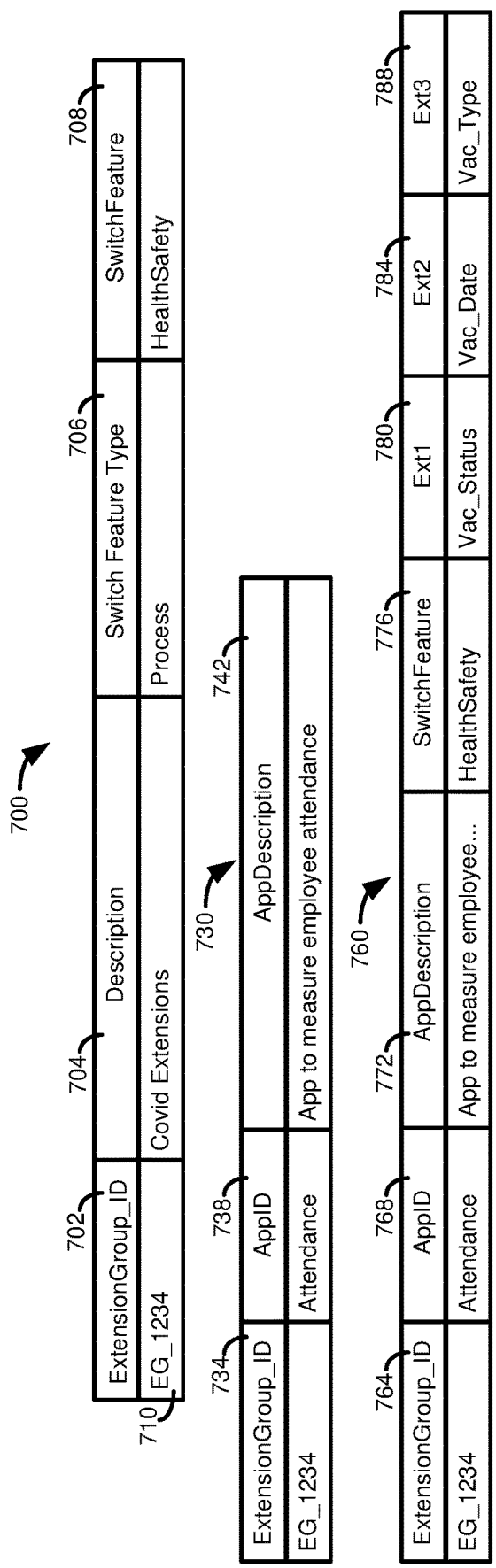
FIG. 7 provides example data structures or data types that can be used to implement and apply extension groups to apps.

An example of a suitable table structure for storing extension group definitional information is presented in FIG. 7 as a table 700 having a column 702 that stores an extension group identifier, a column 704 that stores a description of the extension group, a column 706 that identifies a switch feature type, and a column 708 that holds a switch feature identifier. Table 700 includes a row 710 that illustrates sample values for the columns 702, 704, 706, 708 of the table. Note that values for at least some of the columns of the table can be optional, including only an extension group identifier for the column 702 being required. Similarly, some columns, such as columns 706, 708 can optionally be provided with default values if no specific value is provided by a user in an extension group creation request.

Typically, when a user creates an extension group, it is for the intent of associating the extension group with one or more existing apps (although the disclosed techniques can be incorporated into a process where a user is creating a new app). Accordingly, the extension group generator 608 can send a request 640 to the app repository 612 for a list of available apps. The list of available apps is retrieved/determined (for instance, in a table that lists apps that are available to a particular user, such as a user of the extensibility UI 604), and then is sent to the extensibility UI 604 at 642.

At 644, a user selects one or more apps from the list to which the newly created extension group should be applied (and, optionally, one or more existing extension groups). Identifiers of the selected apps (and optionally extension groups) are sent to the extension group generator 608 at 648. At 652, the extension group generator 608 creates an association between the identified extension group (or extension groups) and the apps selected by the user at 644. The association can be stored in a table, in a particular implementation, such as the table 730 of FIG. 7. The table 730 includes a column 734 for an extension group identifier, a column 738 for an app identifier (thus associating the extension group with the app), and a column 742 that provides a description of the app.

Also at 652, the extension group generator 508 can associate particular extensions included in one or more extension groups for a relevant app/extension group. FIG. 7 illustrates a table 760 that can create associations between apps/extension groups and particular extensions within such extension groups. The table 760 can be used for a variety of purposes, including to determine what extensions should be installed/activated, or made available for activation, for a particular app. As shown, the table 760 includes a column 764 for an extension group identifier, a column 768 for an app identifier, a column 772 for an app description, a column 776 for a switch feature (such as identifying a particular switch feature of the type given in the column 706 of the table 700), and columns 780-788 for particular extensions associated with the row (and thus extension group ID/app ID combination).

Note that the column 776 can be particularly useful when extensions are available from multiple sources, but are desired to be treated together. For instance, assume that a particular app supports extension switching of a particular type, which allows extensions to be selectively displayed (where if the extensions are not displayed, a "base" set of user interface controls/elements are available). A group of extensions might relate to the same semantic concept, but come from different sources, such as one or more extension groups or an extension group and one or more other extension sources (such as custom extensions that are assigned to an app, but may not be associated with an extension group to facilitate associating those extensions with other apps). Grouping the extensions using the switch feature 780 can allow a set of extensions to be selectively activated/made available for activation as a group, rather than having to, for example, manually switch on extensions for each of multiple extension groups. Control returns to the extensibility UI 604 at 656.

With extension group extensions defined, a user can select through the extensibility UI 604 to active or publish the extension group extensions to an app. The user can select one or more apps, and optionally particular extensions, identifiers for which are sent to the proposal generator 606 at 660. At 664, the proposal generator 606 can read the table 760 (or otherwise obtain information about extension group extensions) to be published/activated for a selected app. The proposal generator, also at 664, can determine qualities of the app, such as analyzing a template (e.g., design template) used to define the app, such as determining a floorplan for the app. The proposal generator 606 can then predict how the extension of the extension groups should be implemented in the framework. In some cases, the prediction can be based on other usages of a particular extension. That is, if an extension in an extension group was manually applied to a first app in certain way, that information can be presented as a proposal to a user implementing the extension (as part of an extension group) for a second app. Analyzing the floorplan to which extension group extensions are to be applied, and optionally determining extension use information in order to provide an implementation proposal, can be obtained by sending one or more requests to the apps repository 612 at 668, where the relevant information is returned at 672.

One or more proposals are sent from the proposal generator 606 to the extensibility UI at 676. A user can select a proposal to be used, and can optionally choose to modify at least certain elements of the proposal. The selected proposal, and optionally any modification thereto, are sent to the extension group servicer enhancer 614 at 680. In some cases, the communication sent at 680 can include a proposal ID, and indicators for any changes to the proposal, where the details of the proposal can be retrieved, such as from a database table or view, by the extension group servicer enhancer 614. The extension group service enhancer 614 can implement the extensions associated with the one or more extension groups that have been associated with an app. In a particular implementation, the extensions are activated by annotating data artifacts, such as one or more views of a virtual data model, where in turn changes or additions can be applied to other data artifacts, such as data artifacts in a physical database that is targeted by the virtual data model. In some cases, the extended app can read or translate this information in the data artifacts, such as using data received from the extension group service enhancer 614 at 684, to generate suitable user interface elements, such as a user interface element representing a filter condition specified by a particular extension of a particular extension group.

As a particular example, consider that a result of applying an extension group to an app is the addition of an extension field "Sust_ext_field1," and the proposal option chosen by a user is to add this field as a filter on a list report table. The extension group service enhancer would add these details to an appropriate computing object (such as a CDS view, in technologies available from SAP SE, of Walldorf Germany)

@UI.SelectionField({position: n})
Sust_ext_field1;

Example 8— Example Deployment of Extension Groups to Apps

Figure 8:
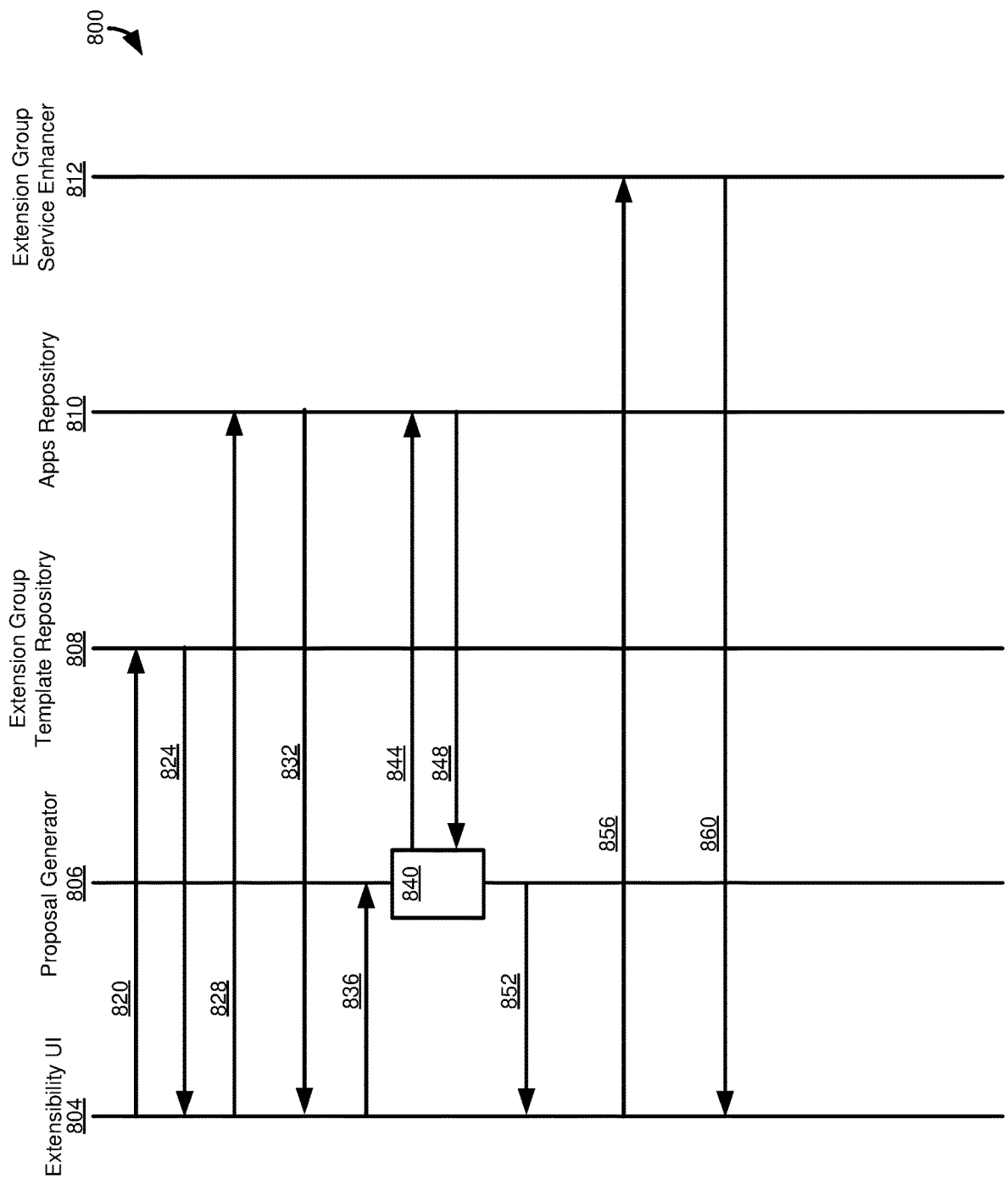
FIG. 8 is a timing diagram of a process for applying an extension group to one or more apps.

FIG. 8 is a timing diagram illustrating operations in a process 800 for selecting one or more extension groups (each having one more extensions) to be applied to an app. The process 800 is generally similar to the process 600 of FIG. 6, but the process 600 contains operations for defining a new extension group whereas the process 800 is used to associate previously defined extension groups with an app. The components used in the process 800 are generally similar to those used in the process 600, including an extensibility UI 804, a proposal generator 806, an extension group template repository 808, an apps repository 810, and an extension group service enhancer 812, which can be analogous to the correspondingly titled components 604, 606, 610, 612, 614 of FIG. 6. Since the process 800 does not involve the creation of a new extension group, the process is not shown as including the extension group generator 608. Of course, even though the extension group generator 608 is not used in the process 800, a computing environment in which the process is executed can include an extension group generator.

A user can use the extensibility UI 804 to send to the extension group template repository 808 a request 820 for a list of available extension groups, which are returned to the extensibility UI in a communication 824. The user can send a request 828 using the extensibility UI 804 to the apps repository 810 for a list of apps that can be extended, such as with one or more extension groups selected by a user. In some cases, all apps available to the user are returned from the apps repository 810 to the extensibility UI 804 in a communication 832, while in other cases app identifiers returned in the communication 832 can be a subset of available apps. For example, a particular extension of an extension group may rely on particular data artifacts. If those data artifacts are not associated with a particular app, then that app may not be identified in the communication 832, which may only include apps that are associated with the relevant data artifacts, or having relevant components thereof (such as particular data elements/attributes).

A user can select one or more apps to be extended by one or more extension groups using the extensibility UI 804, and the identities of the apps/extension groups can be sent to the proposal generator 806 at 836. The proposal generator 806 can then determine one or more proposals for incorporating elements of the selected extension group or extension groups into the select app or apps at 840, which can be carried out in an analogous manner as the operations 664 of FIG. 6, including the sending of a request 844 to, and the receipt of a response from, the apps repository 810 at 848 to obtain floorplan details about the apps to be extended, and optionally other apps to which a particular extension group, or particular extension group elements, have already been applied.

One or more proposals are sent from the proposal generator 806 to the extensibility UI 804 in a communication 852, where the user can then select a proposal to be implemented for particular apps, optionally with particular modifications. The user selects a particular proposal to be implemented (optionally including additions or modifications), which information is sent from the extensibility UI 804 to the extension group service enhancer 812 at 856. The extension group service enhancer 812 then implements extensions associated with one or more selected extension groups, such as described in conjunction with the communication 680 of FIG. 6. The updated app is then rendered on the extensibility UI 804 using extension data (or metadata) received from the extension group service enhancer 812 at 860.

Example 9— Example User Interface Facilitating Deployment of Extension Groups to Apps FIG. 9 is an example user interface screen 900 that lists created/available extension groups, and can be used to create new extension groups or to associate existing extension groups with particular apps. The user interface screen 900 includes navigation options 908, 910, 912, 914 that allow a user to navigate amongst various user interface screens, including the user interface screen 900, to perform various actions to customize apps. In particular, selecting navigation option 908 causes a user interface screen to be displayed that shows custom fields that have been created, or allows a user to create custom fields, and then associate them with apps. Selection of navigation option 910 causes a user interface screen to be displayed that shows data source extensions that have been created, or allows a user to create data source extensions, and then associate particular extensions with particular apps. Selection of navigation option 912 causes a user interface screen to be displayed that shows custom logic that has been defined, or allows a user to define custom logic, and then associate the custom logic with apps. Selection of navigation option 914 causes the user interface screen 900 to be displayed.

The user interface screen 900 includes a search interface 920 that allows a user to search for particular extension groups, and a user interface control 924 that can be selected to create a new extension group.

The user interface screen 900 includes a list 928 of available extension groups, where the list includes a column 932 that provides a semantic label for the extension group, a column 934 that provides an identifier (such as a technical key or identifier) for the extension group, a column 936 indicating a context associated with the extension group (which can be, for example, a particular data object or data artifact used in a particular application, where the data object or artifact can represent an analog-world object or concept, such as a data object representing a "bill of materials," a "supplier," or an "employee"), a column 938 providing a "type" for the extension group (or a particular extension therefor, where the type can indicate a particular data type or functionality associated with an extension group/extension group elements, such as whether the extension group/extension group element is a "flat" textual element, and is a link or path (such as a web address), or has some other functionality—such as a list or interval definition that can be used in application processing). The user interface screen 900 can include additional information describing a particular extension group (or extension thereof), such a column 940 that provides a status of the extension group (for example, whether the extension group has been published/activated, including for a particular app, which can be an app to which the user interface screen 900 is specific), a column 942 that identifies a user who created a particular extension group, and a column 944 that identifies a date on which the extension group was created (or, in other cases, the columns 942, 944 can indicate an individual who last modified an extension group, and a date the extension group was last modified).

Example 10— Example Proposal Generation User Interface

Figure 10:
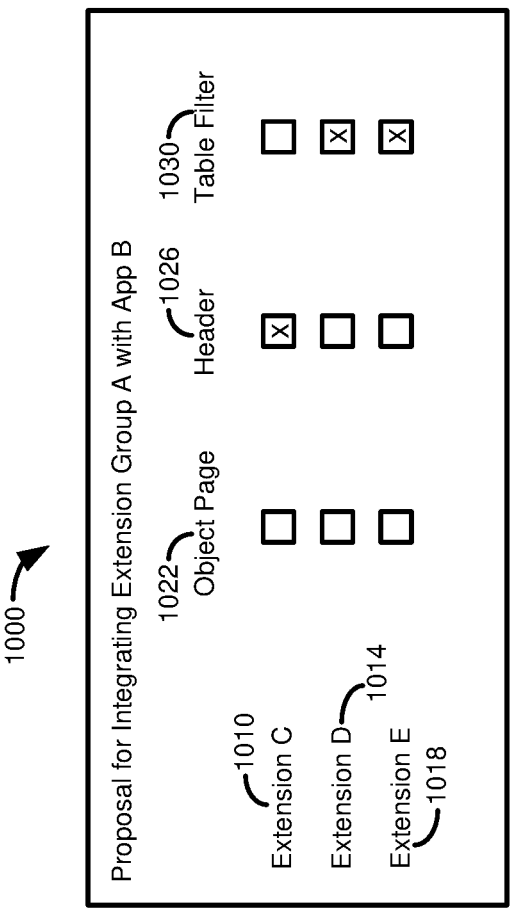
FIG. 10 is an example user interface screen illustrating how extensions can be assigned to particular app layout elements.

FIG. 10 illustrates an embodiment of a user interface screen 1000 that displays a proposal that can be generated by proposal generator for incorporating extensions associated with an extension group (or other extension group) into an app. The user interface screen 1000 includes at least a portion of the extensions associated with the app, extensions 1010, 1014, and 1018. From reading layout information associated with the app, program logic determines that the layout includes an object page 1022, a header 1026, and a table filter 1030 as locations/layout elements where the extensions can be implemented in the app. A user can select a location where a particular extension should be implemented using an appropriate user interface control for a given layout location 1022, 1026, 1030.

The extension group and location information can be saved, and the app can be suitably modified if a user decides to activate/publish the extensions to an app (or a particular instance of an app). If the extension is activated, the app can be modified to include the extensions at the location specified in the proposal (or, at this point, an extension group implementation definition), which can optionally involve modifying particular computing objects (such as data objects or artifacts, such as classes or elements of a virtual or physical data model).

Example 11— Example Technique for Applying Extension Groups to an App

Figure 11:
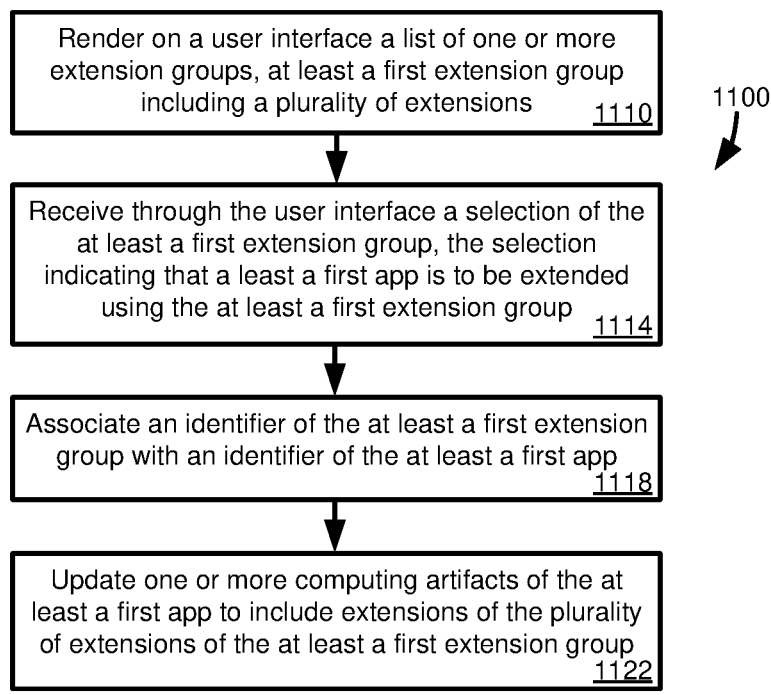
FIG. 11 is a flowchart of an example method for applying an extension group to an app.

FIG. 11 is a flowchart of a method 1100 for associating at least one extension group with at least one app. The method 1100 can be implemented in the computing environment 400 of FIG. 4 or the computing environment 500 of FIG. 5, and the process of FIG. 6 or the process of FIG. 8 can be particular examples of the method 1100.

At 1110, a list of one or more extension groups are rendered on a user interface, where at least a first extension group of the one or more extension groups includes a plurality of extensions. A selection of the at least a first extension group is received through the user interface at 1114, where the selection indicates that at least a first app is to be extended using the at least a first extension group. At 1118, an identifier of the at last a first extension group is associated with an identifier of the at least a first app. One or more computing artifacts of the at least a first app are updated at 1122 to include extensions of the plurality of extensions of the at least a first extension group.

Example 12— Computing Systems

Figure 12:
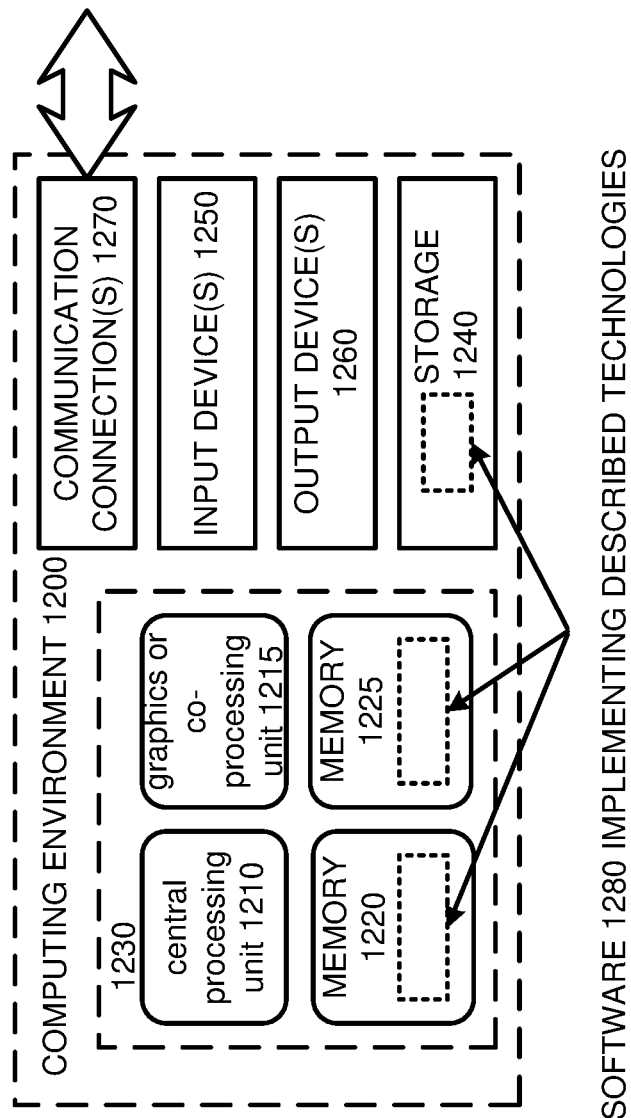
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing a data archival environment, and associated methods, such as described Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270, including input devices, output devices, and communication connections for interacting with a user. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13— Cloud Computing Environment

Figure 13:
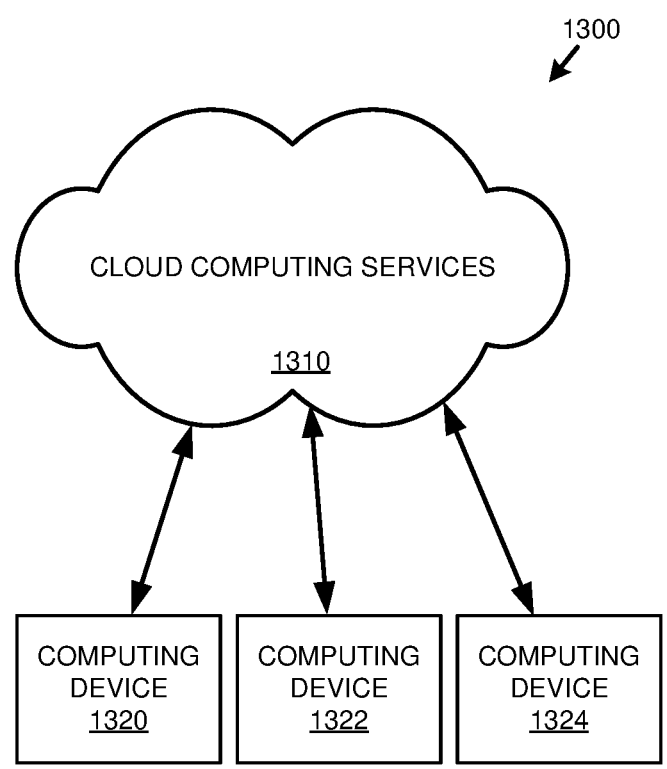
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operations (e.g., data processing, data storage, and the like).

Example 14— Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media storing computer-executable instructions that, when executed, cause the computing system to perform operations comprising:
rendering on a user interface a list of one or more extension groups, at least a first extension group of the one or more extension groups comprising a plurality of extensions;
receiving through the user interface a selection of the at least a first extension group, the selection indicating that at least a first app is to be extended using the at least a first extension group;
associating an identifier of the at least a first extension group with an identifier of the at least a first app; and
updating one or more computing artifacts of the at least a first app to include extensions of the plurality of extensions of the at least a first extension group.

2. The computing system of claim 1, wherein a first computing artifact of the one or more computing artifacts comprises a data artifact of a virtual data model.

3. The computing system of claim 1, wherein at least one extension of the plurality extensions comprises a data filter.

4. The computing system of claim 1, wherein at least one extension of the plurality of extensions comprises an attribute, wherein the updating adds the attribute to a computing artifact of the one or more computing artifacts.

5. The computing system of claim 1, wherein at least one extension of the plurality of extensions defines data processing logic.

6. The computing system of claim 1, the operations further comprising:
receiving through the user interface input indicating that at least a second app is to be extended using the at least a first extension group;
associating an identifier of the at least a first extension group with an identifier of the at least a second app; and
updating one or more computing artifacts of the at least a second app to include extensions of the plurality of extensions of the at least a first extension group.

7. The computing system of claim 6, wherein the user input indicating that the at least a second app is to be extended using the at least a first extension group is received contemporaneously with the receiving the selection.

8. The computing system of claim 1, the operations further comprising:
receiving a request to create an extension group, the request comprising an extension group name;
receiving a second plurality of extensions to be included in the extension group; and
storing identifiers of the second plurality of extensions in association with an identifier of the extension group.

9. The computing system of claim 8, the operations further comprising:
retrieving a third plurality of extensions;
displaying identifiers of at least a portion of the third plurality of extensions on the user interface; and
through the user interface, receiving a selection of one more of the identifiers of the third plurality of extensions displayed on the user interface;
wherein the receiving a second plurality of extensions to be included in the extension group comprises the selection of one or more identifiers of the third plurality of extensions displayed on the user interface.

10. The computing system of claim 8, wherein the receiving a request to create an extension group results in the creation of the at least a first extension group.

11. The computing system of claim 1, the operations further comprising:
retrieving a display template for the at least a first app;
generating one or more proposals for integrating the plurality of extensions of the at least a first extension group into the at least a first app;
displaying the one or more proposals on the user interface; and
receiving through the user interface user input selecting a first proposal of the one or more proposals.

12. The computing system of claim 11, wherein the display template identifies a plurality of display components and, for at least one extension of the plurality of extensions of the at least a first extension group, the one or more proposals provide options for associating that least one extension with given display components of the plurality of display components.

13. The computing system of claim 1, wherein the updating the one or more computing artifacts comprises adding a first extension of the plurality of extensions to a first computing artifact, the operations further comprising:
propagating the first extension to a second computing artifact, where the second computing artifact is referenced by the first computing artifact.

14. The computing system of claim 1, the operations further comprising:
receiving through the user interface an identifier for a switching function with which the at least a first extension group is to be associated, wherein the switching function is activatable to selectively display at least a portion of extensions associated with the at least a first app.

15. A method, implemented in a computing system comprising at least one hardware processor and at least one memory coupled to the at least one hardware processor, the method comprising:
rendering on a user interface a list of one or more extension groups, at least a first extension group of the one or more extension groups comprising a plurality of extensions;
receiving through the user interface a selection of the at least a first extension group, the selection indicating that at least a first app is to be extended using the at least a first extension group;
associating an identifier of the at least a first extension group with an identifier of the at least a first app; and
updating one or more computing artifacts of the at least a first app to include extensions of the plurality of extensions of the at least a first extension group.

16. The method of claim 15, further comprising:
receiving through the user interface input indicating that at least a second app is to be extended using the at least a first extension group;
associating an identifier of the at least a first extension group with an identifier of the at least a second app; and
updating one or more computing artifacts of the at least a second app to include extensions of the plurality of extensions of the at least a first extension group.

17. The method of claim 15, further comprising:
retrieving a display template for the at least a first app;
generating one or more proposals for integrating the plurality of extensions of the at least a first extension group into the at least a first app;
displaying the one or more proposals on the user interface; and
receiving through the user interface user input selecting a first proposal of the one or more proposals.

18. One or more non-transitory computer-readable storage media comprising:
computer-executable instructions that, when executed by a computing system comprising at least one hardware processor and at least one memory coupled to the at least one hardware processor, cause the computing system to render on a user interface a list of one or more extension groups, at least a first extension group of the one or more extension groups comprising a plurality of extensions;
computer-executable instructions that, when executed by the computing system, cause the computing system to receive through the user interface a selection of the at least a first extension group, the selection indicating that at least a first app is to be extended using the at least a first extension group;
computer-executable instructions that, when executed by the computing system, cause the computing system to associate an identifier of the at least a first extension group with an identifier of the at least a first app; and computer-executable instructions that, when executed by the computing system, cause the computing system to update one or more computing artifacts of the at least a first app to include extensions of the plurality of extensions of the at least a first extension group.

19. The one or more non-transitory computer-readable storage media of claim 18, further comprising:

computer-executable instructions that, when executed by the computing system, cause the computing system to receive through the user interface input indicating that at least a second app is to be extended using the at least a first extension group;

computer-executable instructions that, when executed by the computing system, cause the computing system to associate an identifier of the at least a first extension group with an identifier of the at least a second app; and computer-executable instructions that, when executed by the computing system, cause the computing system to update one or more computing artifacts of the at least a second app to include extensions of the plurality of extensions of the at least a first extension group.

20. The one or more non-transitory computer-readable storage media of claim 18, further comprising:

computer-executable instructions that, when executed by the computing system, cause the computing system to retrieve a display template for the at least a first app;

computer-executable instructions that, when executed by the computing system, cause the computing system to generate one or more proposals for integrating the plurality of extensions of the at least a first extension group into the at least a first app;

computer-executable instructions that, when executed by the computing system, cause the computing system to display the one or more proposals on the user interface; and computer-executable instructions that, when executed by the computing system, cause the computing system to receive through the user interface user input selecting a first proposal of the one or more proposals.

\* \* \* \* \*